United States Patent [19]
Hamy

[11] Patent Number: 5,765,320
[45] Date of Patent: Jun. 16, 1998

[54] LINEAR ACTUATOR

[76] Inventor: Norbert Hamy, 236 The Kingsway, Etobicoke, Ontario, Canada, M9A 3T5

[21] Appl. No.: 632,488

[22] PCT Filed: Oct. 20, 1994

[86] PCT No.: PCT/CA94/00578

§ 371 Date: May 3, 1996

§ 102(e) Date: May 3, 1996

[87] PCT Pub. No.: WO95/11394

PCT Pub. Date: Apr. 27, 1995

[30] Foreign Application Priority Data

Oct. 22, 1993 [CA] Canada .................................. 2109051

[51] Int. Cl.[6] .................................................. E04H 12/18
[52] U.S. Cl. .................................................. 52/108
[58] Field of Search .................... 52/108; 29/446; 428/906

[56] References Cited

U.S. PATENT DOCUMENTS

| | | | |
|---|---|---|---|
| 3,319,987 | 5/1967 | Bohr et al. | 52/108 X |
| 3,360,894 | 1/1968 | Sharman et al. | 52/108 |
| 3,601,940 | 8/1971 | Simon | 52/108 |
| 3,696,568 | 10/1972 | Berry | 52/108 |
| 3,811,633 | 5/1974 | Cummings et al. | 52/108 X |

*Primary Examiner*—Christopher Kent
*Attorney, Agent, or Firm*—Marks & Clerk

[57] ABSTRACT

A linear actuator has a drum, a stiff flexible ribbon wound on the drum, a device for rotating the drum at least to partially unwind the ribbon thereon, a guide funnel for gradually forming the ribbon into a tubular configuration as it comes off the drum, and an attachment device at a free end of the ribbon for connection to an object to be moved in a linear path. The actuator converts rotary motion to linear motion without the need for complex mechanical linkages.

12 Claims, 5 Drawing Sheets

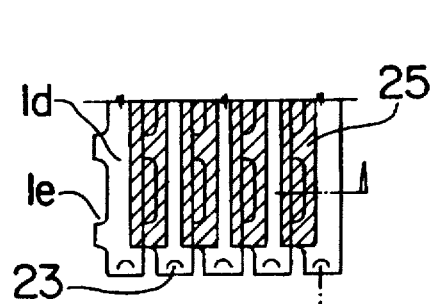
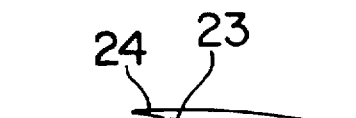
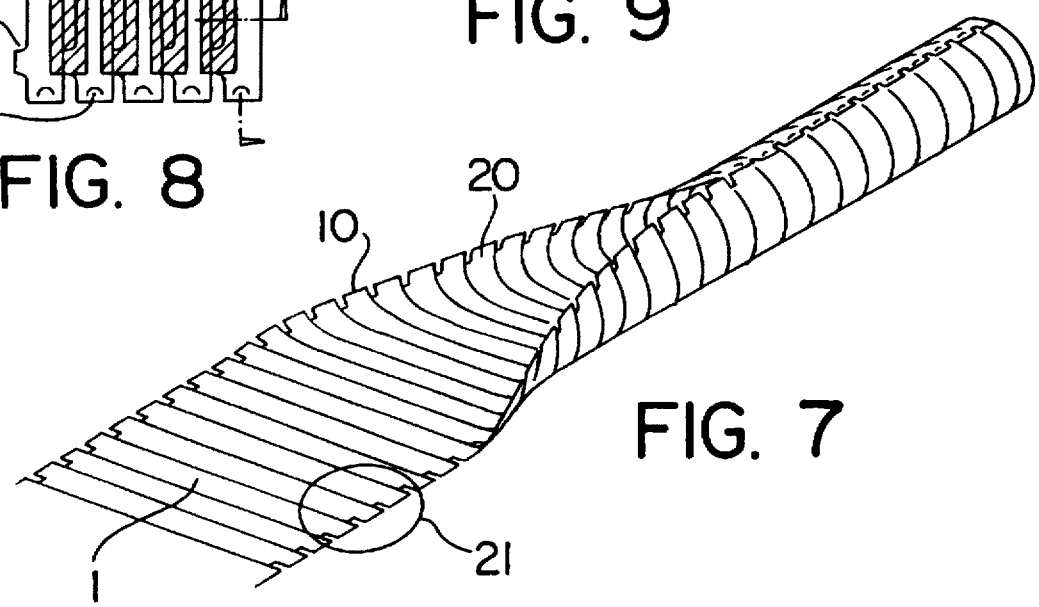
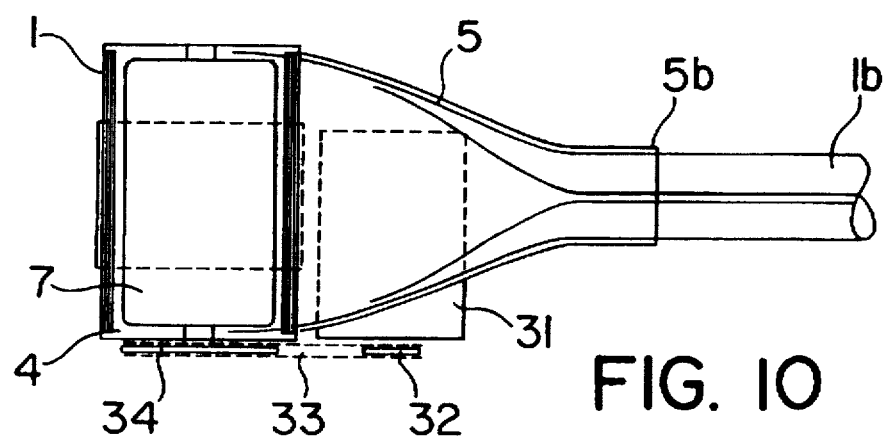

LINEAR ACTUATOR

This invention relates to mechanical actuators, and more particularly to a linear actuator for producing linear motion from rotary motion.

There are many practical applications that require linear motion, such as actuators for sliding doors, door openers, car windows, throttle actuation, car seats, trunk lids, aerospace equipment, and robotics.

Numerous prior art techniques are known for providing such linear motion. These can generally be divided into two classes, namely systems that have a rotary drive motor connected to some form of linkage, such as a crankshaft or Archimedes screw to produce the linear motion; or linear drive systems, such as hydraulic or pneumatic rams, or linear motors that produce the linear motion directly.

All these prior art devices have in common the fact that they result in complexity of moving parts, undue weight, space inefficiency and high cost.

U.S. Pat. No. 3,319,987 describes an extendible boom for such applications as lifts, antennas, elevators, manipulators and the like. This patent describes a coiled flat ribbon that can wound off a drum into an extended load-supporting tube. While this patent describes a device that has important practical applications, it is not suitable for applications that involve the repetitive reciprocation undergone by a linear actuator because such repetitive motion weakens the ribbon, and where it comes off the drum it tends to flex. As a result, play between the drum and collar rapidly develops, and reliable and precise extension of the arm become impossible.

An object of the invention is to provide a simple device for providing linear motion in an efficient and reliable manner.

According to the present invention there is provided a linear actuator comprising a drum, a stiff flexible ribbon windable onto the drum, drive means for rotating the drum so as to alternately wind and unwind the ribbon onto and off the drum, a shaped guide arrangement adjacent the drum for gradually forming the ribbon leaving the drum into a tubular configuration, and attachment means at a free end of said tubular configuration for connection to an object to be moved in a linear path. The shaped guide arrangement is a tapered funnel having a shallow widened portion adjacent the drum and progressively merging into a tubular portion forming an outlet for the ribbon. The tapered funnel conforms to the shape of the ribbon as it is gradually formed into a tubular configuration. A spring-mounted retainer strap extends around the drum and remains in contact with the ribbon as it is wound onto and off the drum.

The tubular configuration can have varying cross-sections, such as round or oval, and it is not necessary for the edges of the ribbon to abut. The tube must merely have sufficient curvature to give it the desired degree of compressive strength. In a preferred embodiment of the invention, suitable for applications where a long reach is required, such as aerospace, the edges of the ribbon are designed to interlock such that the edges join together zipper fashion as the tube emerges from the funnel.

In accordance with the invention, the portion of the ribbon formed into a tubular configuration serves as a push rod for imparting linear motion to the object. Because of its tubular shape, it attains considerable axial compressive strength. Preferably, the ribbon is extruded in tubular shape, so that inherently it has this configuration and naturally tends to take up a tubular shape due to memory effect as it comes off the drum.

The ribbon can be conveniently made of resilient plastic or metal. A suitable ribbon, for example, might have a width of 5 cms. and a thickness of 0.5 mm.

The drum is normally driven by a drive motor, which may be mounted either behind the drum, inside the drum, or underneath the guide means and connected to the drum by means of a drive chain. Alternatively, the drum could, for example, be connected to a hand crank if manual operation of the actuator were desired.

The guide arrangement is preferably formed into the shape of a funnel having a flat widened portion adjacent the drum, the funnel gradually merging into a cylindrical outlet so as to assist the forming of the ribbon as it comes off the drum into a tubular configuration. Alternatively, other forms of guide means, such as rollers and the like could be employed.

A retainer strap is preferably placed around the periphery of the drum to retain the ribbon in place and positively feed it into the funnel as it comes off the drum.

The actuator of the invention can be made with a minimal number of moving parts. It is also simple in construction since it employs no linkages between the rotary and linear portions of the system. This results in a considerable improvement in efficiency and also reduction in noise.

The funnel can be lubricated as necessary to assist the passage of the ribbon therethrough.

The invention will now be described in more detail, by way of example only, with reference to the accompanying drawings, in which:

FIG. 7 is a view of an alternative form of ribbon;

FIG. 8 shows a detail of FIG. 7;

FIG. 9 is a sectional view through overlapping edges of the ribbon shown in FIG. 7;

FIG. 10 is a plan view of a linear actuator and motor assembly in accordance with the invention;

Figure 1:
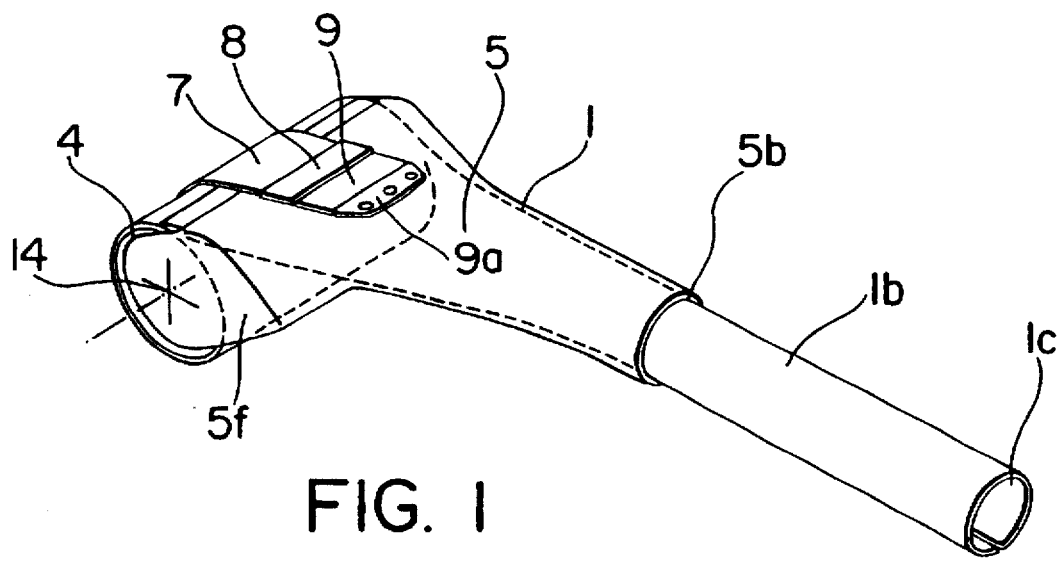
FIG. 1 is a top perspective view of a portion of a linear actuator in accordance with the invention.
Figure 2:
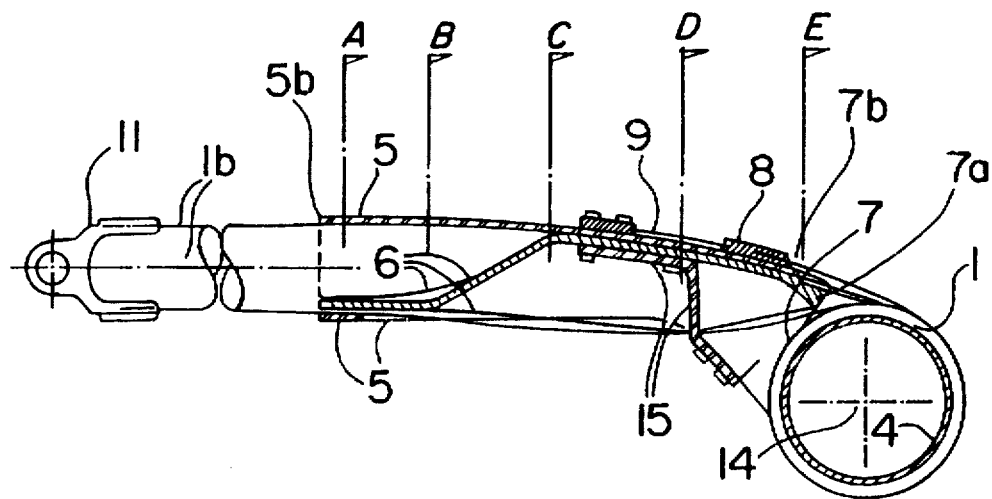
FIG. 2 is a longitudinal sectional view of the actuator shown in FIG. 1.
Figure 4:
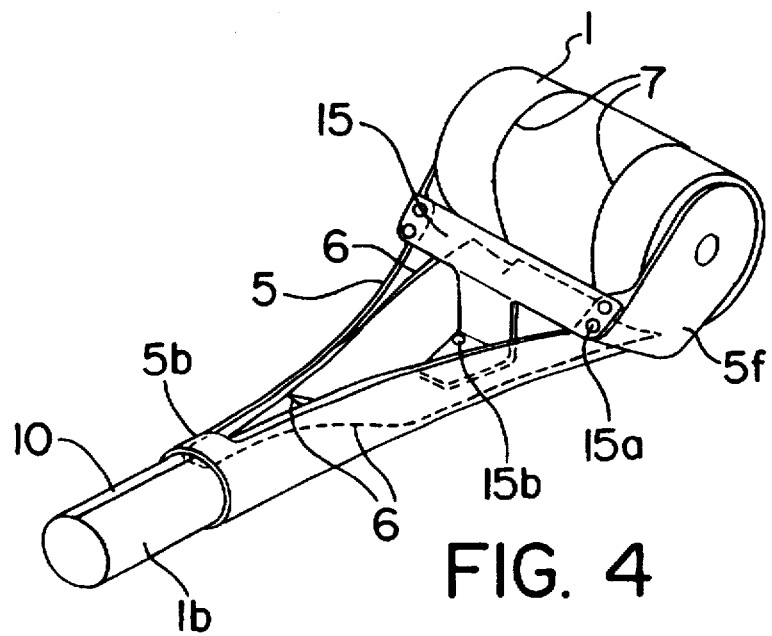
FIG. 4 is a perspective view of the underside of the actuator.
Figure 5:
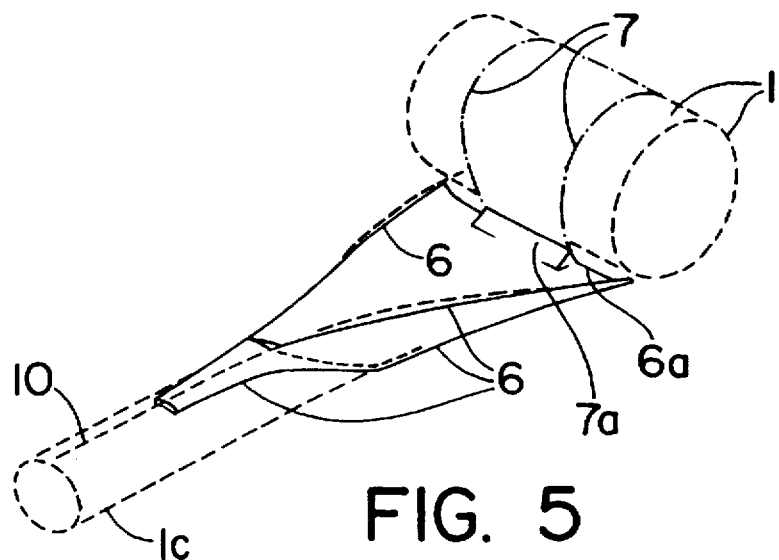
FIG. 5 is a perspective view of the underside of with the outer housing removed.

Referring now to FIG. 1, the linear actuator comprises a wide flexible ribbon 1, of steel or resilient plastic, wound onto a drum 4 rotatably mounted about axis 14 between wing portions 5f of an outer housing forming a guide funnel 5 for the ribbon coming off the drum 4. A bracket 15 (FIG. 4) is attached to wing portions 5a on the underside of the actuator by bolts 15a.

The ribbon 1 is preferably extruded in tubular form during manufacture such that when it is laid out flat it naturally tends to assume a tubular shape due to memory effect.

Figure 3:
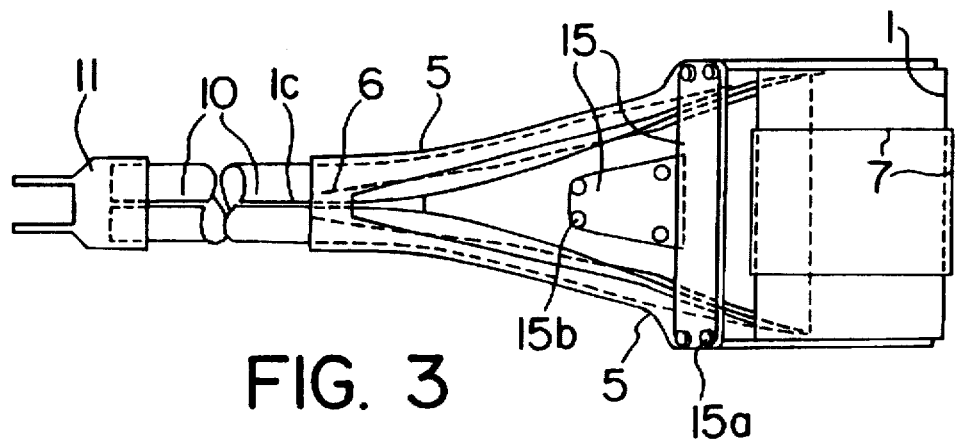
FIG. 3 is an underside view of the actuator shown in FIG. 1.

As the ribbon comes off the drum 4, it enters the guide funnel 5 through shallow widened end 5a, which is generally rectangular in cross-section, but open on the lower side. The shallow end 5a progressively tapers through a transition zone 5e into a tubular outlet end 5b remote therefrom so as to assist in the forming of the tube into a tubular configuration as it passes through the funnel 5. The lower side of the funnel 5 has a generally V-shaped opening 5c (FIG. 3).

Within the opening 5c is fitted an inner saddle-like form 6, which is generally complementary to the shape of the funnel 5. The inner form 6 is attached to bracket 15 by bolts 15b.

When the ribbon 1 comes off the drum 4, it passes between the funnel 5 and the inner form 6, gradually acquiring a tubular configuration so that edges 10 abut each other. A fastening lug 11 for attachment to an object to be moved in a linear path is fitted to the distal end of the tubular portion 1b.

Retention strap 7 extends around the drum 4, and is attached at one end 7a to the inner end 6a of the inner form 6. The other end 7b is attached by freely floating clamp 8 to a spring 9 anchored by block 9a to the top side of the funnel 5. As the ribbon 1 alternately winds off and onto the drum 4, the spring 9 deflects allowing the strap 7 to be displaced so as to accommodate the changing thickness of the ribbon 1 wound onto the drum 4 due to the changing number of turns. Retention strap 7 is made of substantially inextensible steel or hard rubber, the main requirement being that it have a low coefficient of friction. Spring 9 is made of spring steel or rubberized woven material.

As can be seen in FIG. 1, the effect of the funnel 5 and co-operating inner form 6 is to enhance the natural tendency of the ribbon 1 to form itself into a tubular configuration as it comes off the drum 4. The portion 1 b of the ribbon 1 emerging from the end 5b of the funnel 5, (FIG. 3), is in the form of a tube 1b with a slit 1c on the lower side thereof where the edges 10 of the ribbon 1 meet.

Figure 6A:
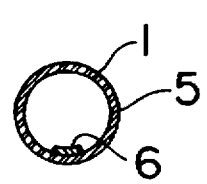
FIGS. 6a to 6e are sections taken along lines A, B, C, D, E in FIG. 2.
Figure 6B:
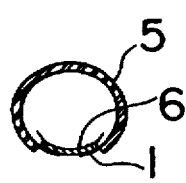
Figure 6C:
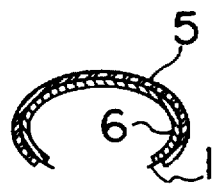
Figure 6D:
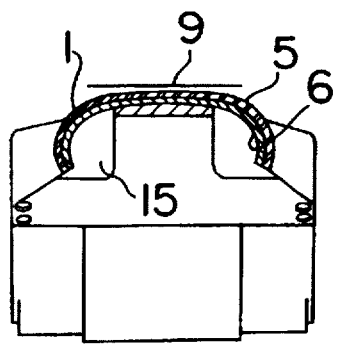
Figure 6E:
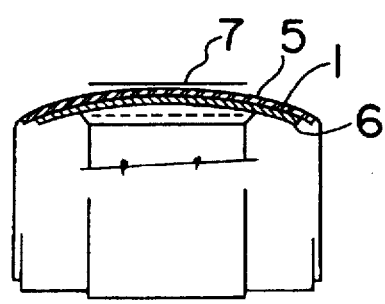

FIGS. 6a to 6e show the gradually changing shape of the ribbon 1 as it passes through the funnel 5, which as can be seen conforms to the changing shape of the ribbon as it is gradually formed into a tube. As it comes of the drum 4 (FIG. 6e), the ribbon 1 only has a slight curvature, which becomes progressively more tubular on passing through the funnel 5 (FIGS. 6d to 6a).

In an alternative embodiment (see FIGS. 7 and 8), the edges 10 of the ribbon are have interlocking lugs 20 (somewhat in the manner of a zipper) so that they hook together or interlock as they emerge in tubular form. This enhances the compressive strength of the tubular extension.

The ribbon 1 shown in FIG. 7 is also made of a succession of generally rectangular segments 1d. This arrangement permits a tube to be formed that has high compressive strength while having sufficient flexibility to be wound onto the drum 4. Each segment is joined to the next by an overlapping fabric ribbon 25 F(FIG. 8) bonded with adhesive to the adjacent segments 25 on the inner side. The segments 1d also have cut-out portions 1e along their side edges for lightness.

Referring to FIG. 8, which shows a detail of a portion 21 of the ribbon 1, the lugs 20 have raised cutout semi-circular tongues 23 bent outwardly therefrom. When the overlapping lugs 20 from opposed edges meet, as shown in FIG. 9, the tongues 23 engage complementary tongues 24 on the opposed edge. To assist in this engagement the outlet end 5b of the funnel 5 is made slightly narrower than the tubular portion 1b so that the edges 10 are forced to overlap more than the final amount. As the edges 10 spring back on emerging from the outlet 5b, the tongues 23, 24 come into engagement.

The tongues 23, 24 are resiliently bent out of the ribbon 1. As a result, when the ribbon 1 is wound onto the drum 4 they are easily deflected so as to lie flat in the ribbon 1. As the ribbon comes off the drum 4, they once again spring into the raised position.

As a result of being formed into a tubular configuration, the portion 1b of the ribbon 1 emerging from the outlet end 5b of the funnel 5 has considerable axial strength. The ribbon 1 is generally made of steel or plastic that is sufficiently stiff to provide axial strength in this configuration, yet of course flexible enough to be easily wound onto the drum 4.

Figure 11:
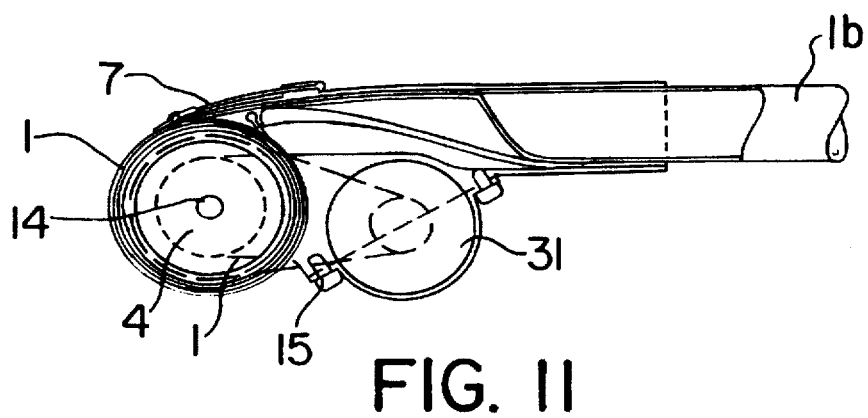
FIG. 11 is a side view of the assembly shown in FIG. 10.

The drum 4 can be driven by any suitable drive arrangement, such as an electric motor or cable linkage. FIGS. 10 and 11 show an electric motor 31 attached to bracket 15 driving axle 30 of drum 4 via pulleys 32, 33 and drive belt 34. Alternatively, a drive chain or drive gears can be employed, of the electric motor can be mounted directly inside the drum 4 for compactness.

In operation, the drum 4 is driven in forward and reverse rotary motion. This causes the ribbon 1 alternately to unwind from and wind onto the drum 2. As the ribbon 1 unwinds, it is formed into tubular configuration by the funnel 5, and the tubular portion 1b moves in a linear path away from the end 5b of the funnel. As the ribbon winds onto the drum 1, the portion 1b is withdrawn toward the end 5b of the funnel. The net effect of this arrangement is that winding and unwinding of the ribbon 1 from the drum 5 causes the end 1b, formed into a tubular configuration, to undergo a reciprocating motion along a linear path. Because the ribbon is formed into a tube, it has a high compressive strength.

Figure 12:
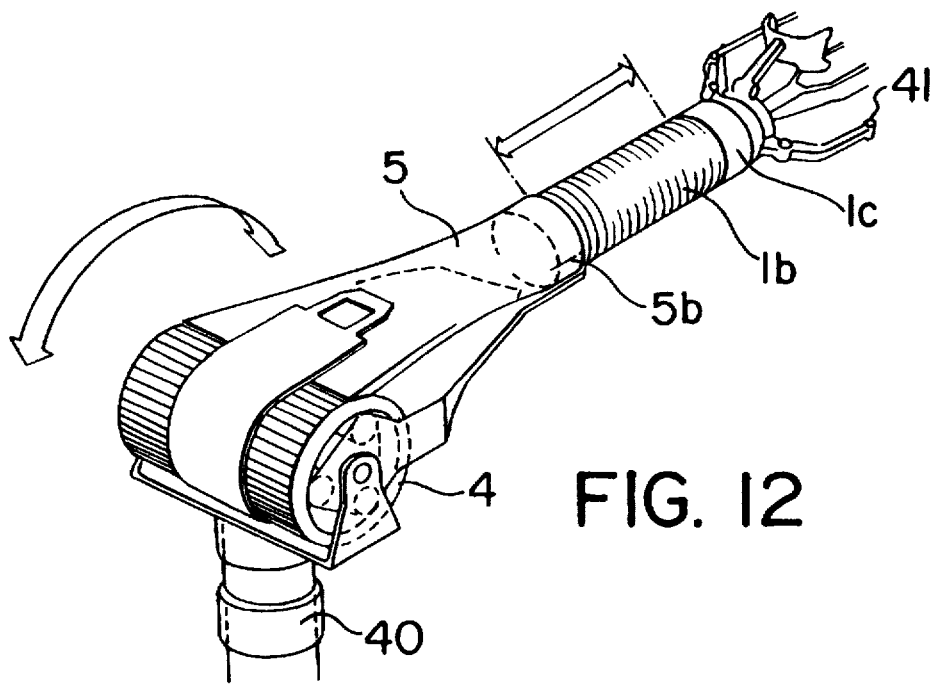
FIG. 12 is a perspective view of a remote manipulator arm incorporating an actuator in accordance with the invention.

FIG. 12 shows an embodiment of the present invention incorporated into a manipulator arm, for example for use in space. In this embodiment the ribbon 1, which has the configuration shown in FIGS. 7 and 8, has a reach of 350 ft. The drum 4 is articulated on a support post 40 and the funnel 5 is also rotatable through 180° in the vertical plane. The distal end 5b of the ribbon 1 is attached to a gripper member 41 for grabbing objects, such as satellites and the like.

Electrical control wiring for the gripper member 41 or any ancillary equipment at the end of the tube can be fed from the underside of the funnel 5 into the forming tube 1b from a separate drum not shown.

It will now be apparent that the concept of unwinding a flat ribbon from a drum and forming it into a tubular configuration, such that the tubular portion serves as a push rod for moving an object in a linear path, is a particularly efficient way of providing linear motion for a wide range of applications. The minimal number of moving parts and absence of a pivotal linkage between the rotary and reciprocating portions of the system makes the actuator especially useful for applications where reliability is of prime importance.

I claim:

1. A linear actuator comprising:

a drum;

a stiff flexible ribbon windable onto the drum;

drive means for rotating the drum so as to alternately wind and unwind the ribbon onto and off the drum;

a shaped guide arrangement adjacent the drum for gradually forming the ribbon leaving the drum into a tubular configuration, and attachment means at a free end of said tubular configuration for connection to an object to be moved in a linear path, said shaped guide arrangement comprises a tapered funnel having a shallow widened portion extending up to said drum and progressively merging into a tubular portion forming an outlet for the ribbon, and said tapered funnel conforming to the ribbon as said ribbon is gradually formed into a tubular configuration; a spring-mounted retainer strap extending around the drum and remaining in contact with the ribbon as said ribbon is wound onto and off the drum; and attachment means at a free end of said tubular configuration for connection to an object to be moved in a linear path.

2. A linear actuator as claimed in claim 1, further comprising a complementary inner form fitted into said funnel, around which said ribbon passes as said ribbon moves through the funnel.

3. A linear actuator as claimed in claim 1, wherein the ribbon (5) has interlocking edges that mutually engage as said ribbon leaves the funnel.

4. A linear actuator as claimed in claim 3, characterized in that said interlocking edges (10) have opposed mutually engaging cut-out tongues (23, 24) that spring outwardly from a main surface of the ribbon, and said funnel (5) has an outlet that is narrower than the formed tubular configuration so that as the ribbon leaves the funnel, the tongues (23, 24) on opposed edges of the ribbon are pushed over each other whereupon they subsequently engage as the edges of the ribbon spring back to a final shape on leaving said funnel.

5. A linear actuator as claimed in claim 1, wherein said ribbon comprises a series of transversely extending, interconnected segments.

6. A linear actuator as claimed in claim 5, wherein said segments are interconnected by overlapping fabric strips bonded to adjacent segments.

7. A linear actuator as claimed in claim 2, wherein one end of the retainer strap is connected to said funnel by means of a spring member.

8. A linear actuator as claimed in claim 7, wherein another end of said retainer strap is connected to said complementary inner form fitted into said funnel.

9. A linear actuator as claimed in claim 1, wherein said drive means is a drive motor.

10. A linear actuator as claimed in claim 9, wherein said drive motor is mounted inside said drum.

11. A linear actuator as claimed in claim 1, wherein said flexible ribbon is of inherently tubular shape such that said ribbon naturally tends to adopt a tubular configuration as said ribbon comes off the drum due to memory effect.

12. A linear actuator as claimed in claim 1, wherein said attachment means comprises a gripper member.

* * * * *